INVENTOR.
ALEXANDER R NORDEN

BY Hoggood & Calimafde

ATTORNEYS.

July 18, 1967

A. R. NORDEN 3,331,576

RETAINER MEANS FOR CIRCUIT PANEL BOARD OR THE LIKE

Filed Aug. 31, 1965

INVENTOR.
ALEXANDER R NORDEN

BY

*Hopgood & Calimafde*

ATTORNEYS.

United States Patent Office 3,331,576
Patented July 18, 1967

3,331,576
RETAINER MEANS FOR CIRCUIT PANEL BOARD OR THE LIKE
Alexander R. Norden, New York, N.Y., assignor to Murray Manufacturing Corporation, Brooklyn, N.Y., a corporation of New York
Filed Aug. 31, 1965, Ser. No. 484,002
7 Claims. (Cl. 248—205)

This invention relates to means for retaining a circuit panel board or other structure at a desired distance from a base.

The panel board may be such as used to carry house servicing electrical equipment, for example, circuit breakers or fuses, and is commonly mounted in a box or enclosure set into or on a house wall. Previously, a panel board has been supported in the enclosure by ordinary threaded nut and bolt means involving threaded posts or bolts extending from the base of the enclosure and carrying nuts which support the panel board and are turnable on the bolts to adjust the position of the panel board along the bolts. This method is slow and hence costly, both in making level adjustments and in removing the interior for pulling cables. An alternative arrangement conventionally used is to mount the panel on studs with springs at the back. This method is not completely satisfactory, however, because pressure on the circuit breakers from the front of the panel may dislodge the panel, or the connected cables may produce a dislodging force.

Accordingly, it is an object of this invention to provide a retainer of rigid characteristics similar to the retaining nature of bolts and nuts, yet which allows quick adjustment or complete removal of the panel with which it is associated.

An object of the invention is to provide a retainer of spring material formed with an open-ended slot for reception of a mounting bolt at its minor diameter; that is, between threads, the retainer to be carried by the structure to be supported and to be movable on this structure transversely of the bolt to lodge the slot furcations between bolt threads, so as to retain the structure in a chosen position along the bolt. Preferably, the retainer slot is suitably curved, with the closed end of the slot rounded so that it may fit closely to the mounting bolt between threads.

It is an object of the invention to make such retainer of sheet material, for example of spring steel, which is rigid enough to serve as a firm support for a structure such as a panel board and yet is capable of deformation under manual stress, whereby when the furcations of the retainer slot are manually forced between threads of the mounting bolt, the threads will resiliently distort the slot furcations, with the effect of spring locking the retainer against separation from the bolt.

It is a further object to provide such a retainer as a U-shaped element with a pair of similar parallel and flat plate arms having aligned open ended slots for grasping a mounting bolt between threads; the plate material being thinner than the thread pitch.

The U-shaped retainer is adapted to be slipped over an edge of a mounting plate or bar section of the panel board and to straddle the thickness of the plate. By utilizing the dual locking action of two arms the relatively thin retainer material is, in effect, reinforced by the straddled plate. This occurs since a force on the plate in either direction along the bolt axis will cause one arm to be pressed against the plate, a rigid member. The plate will have a free passage for mounting a bolt and will be provided with a stud over which a larger hole in an arm of the retainer may be sprung, by flexing the arm, to locate the retainer approximately with respect to the bolt and to simultaneously retain the retainer on the mounting plate. The loose location of the retainer with respect to the bolt passage through the plate permits initial movement of the retainer relative the bolt so that the furcations may "find" the bolt; thereby compensating for center misalignment due to manufacturing tolerances.

The above mentioned and other features and objects of said invention and the manner of attaining them will become more apparent, and the invention itself will best be understood by reference to the following description of an embodiment of the invention, taken in conjunction with the accompanying drawings, wherein.

Figure 1:
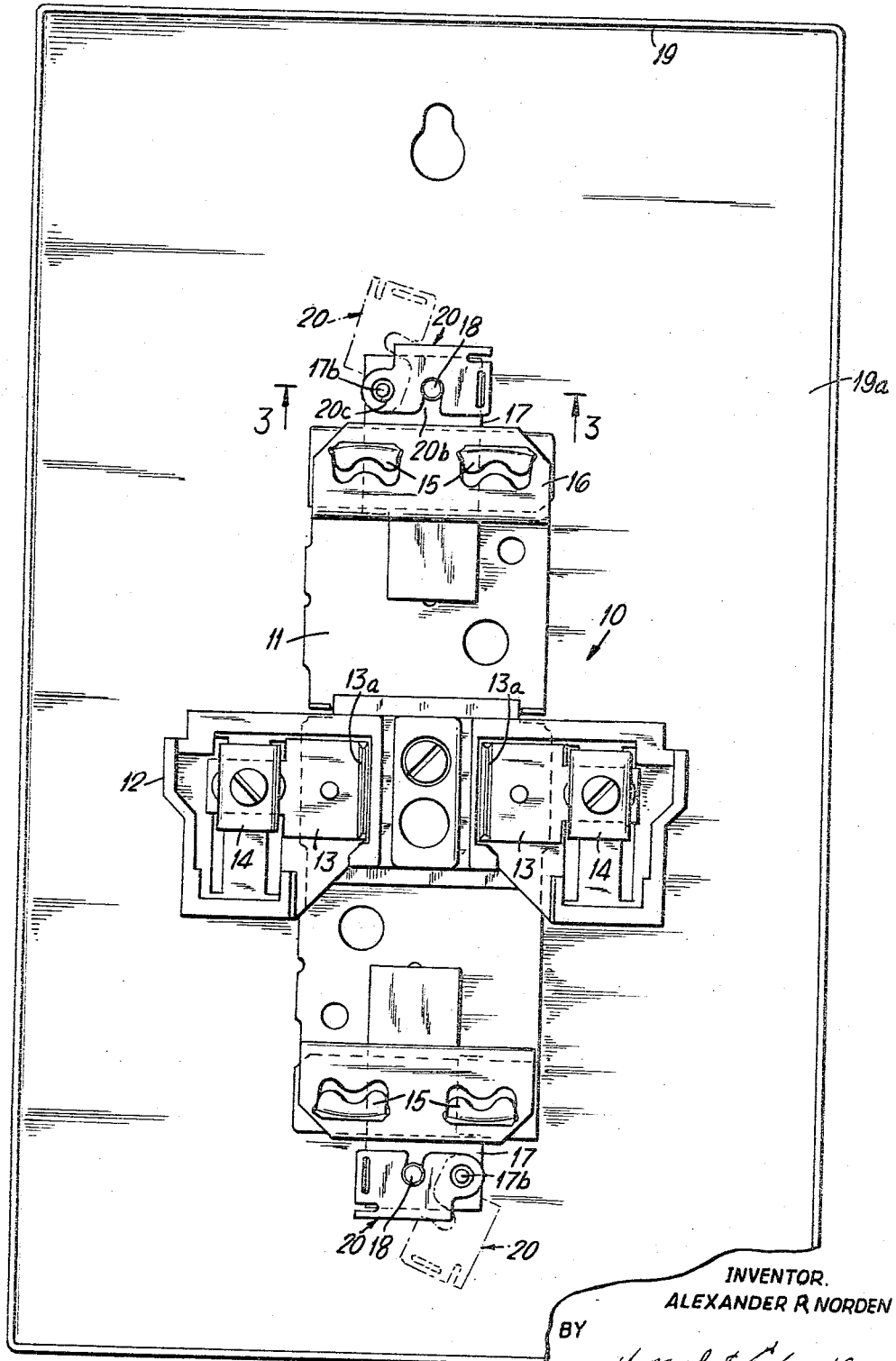
FIG. 1 is a plan view of an illustrative, circuit breaker-mounting panel board as supported within an enclosure by means involved in the invention.
Figure 2:
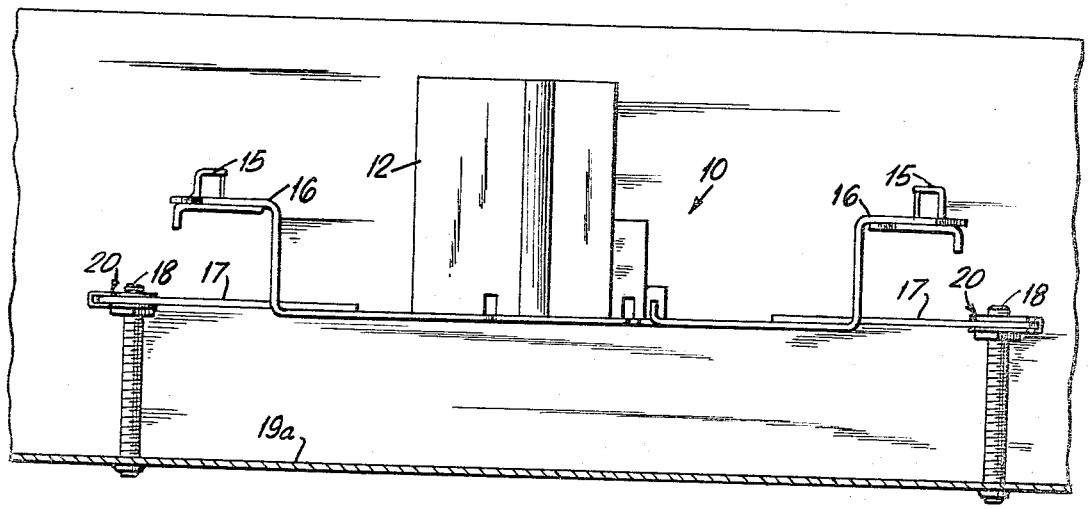
FIG. 2 is a side view of the panel board and also shows the enclosure base in section.
Figure 3:
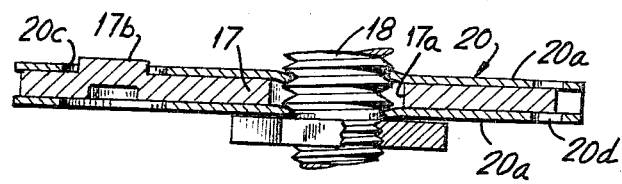
FIG. 3 is an enlarged sectional view along line 3—3 of FIG. 1.
Figure 4:
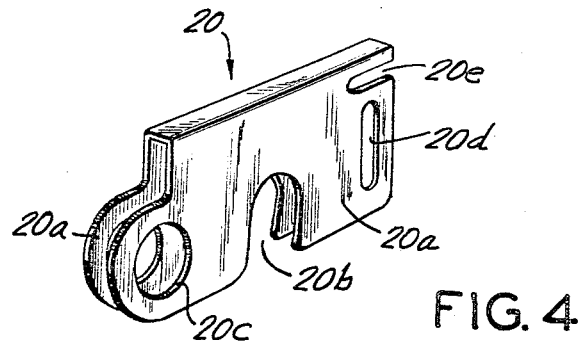
FIG. 4 is an enlarged perspective view, on a smaller scale than FIG. 3, of one of the novel retainers.

The illustrative panel board 10 comprises a metal channel member 11 which mounts an insulating block 12 for a pair of buses 13 and associated line connectors 14. The buses are formed with upturned blades 13a for engagement by known circuit breakers (not shown) adapted to be held in place by the usual hooks 15 on the end flanges 16 of the channel member 11. Rigidly extending from the opposite ends of the base of the channel member and reaching beyond the flanges 16 are outboard bars 17. The bars 17 are drilled to provide passages 17a through which threaded mounting posts or bolts 18 extending from the base 19a of an enclosure 19 pass with ample clearance. Each bar 17 is formed up with a locating stud 17b for a retainer or keeper 20 provided by the invention.

The retainer 20 is U-shaped and its two arms 20a are initially parallel and flat. Arms 20 have aligned open-ended slots 20b for reception of a bolt 18 at its minor diameter and also have aligned locating holes 20c either of which may be set over the locating stud 17b of an outboard bar 17. Apertures 20d and 20e are useful in manipulating the retainer. The retainer is made of, for example, spring steel, having a thinner gauge than the thread pitch of a bolt 18. Alternatively, any similarly thick material which would resiliently distort along the slot furcations as a result of bolt contact could also be employed. The spacing between the arms 20a is just enough to enable the retainer to be slipped easily over an edge of a bar 17 and to straddle the thickness of the bar. Needless to say, the thickness of the bar and the spacing between the arms 20a exceeds the thread pitch of a bolt 18. As the retainer 20 is slipped onto a bar 17, its arms 20a are flexed to spring the locating hole 20c in the upper arm over the locating stud 17b on the bar, so that the retainer will be held to the bar. The hole 20c is considerably larger than the stud 17b to allow the retainer to be shifted translatably (parallel the bar). The mean radial distance between the locating holes 20c and the slots 20b of a retainer is approximately equal to the center-to-center distance between a stud 17b and bolt passage 17a of a bar 17. The previously mentioned translation allowance compensates for manufacturing tolerances and allows the slot to "find" the bolt.

Prior to engagement with an adjacent bolt 18, the retainer 20 on a bar 17 has the open ends of the slots 20b of the two arms confronting the bolt. The retainer slots are shaped and sized for reception of the bolt at its minor diameter, the closed ends of the slots being substantially semicircular to fit closely to the bolt between threads. When the retainer is pushed against the bolt, the furcations of the slots 20b in the two retainer arms 20a are forced between threads of the bolt and are bent and distorted by the camming pressure of the threads. The resulting deformation of the furcations and, hence, of the two arms of the retainer effectively locks the retainer against separation from the bolt except by the exercise of inordinate force. The locked connection between the retainer and the bolt is steadied by the straddling of the bar by the retainer arms. Thus, any force on the retainer along the bolt axis will bring one retainer arm to bear upon the bar. Consequently, whereas one arm would produce a locking force, this force could be overcome by sufficient pressure in the direction which would move the retainer away from the bar and either break it or deform it sufficiently so that it disengages the bolt. With two arms, however, the bar backs up a retainer arm in either direction of displacement force and a large magnitude of sheer stress would have to be developed to break or disengage the mate.

The panel board is freely adjustable along the pair of bolts 18 as long as the retainers 20 on the bars 17 of the panel board are retracted. After the panel board has been brought to the desired position, the retainers are forced against the bolts to be locked thereto and thereby to retain the panel board in the chosen position, the panel board being supported like a bridge between the two bolts.

It is understood that the panel board retaining and supporting means provided by the invention may be used in conjunction with more than two guiding and mounting bolts 18 or with only a single bolt, in the latter event, additional means being provided for translatably guiding the panel board. For each bolt, or threaded mounting post, the panel board will have an outboard or free-edge section to pass a bolt and carry a retainer 20 for locking engagement with the bolt.

While there have been described above, the principles of the invention in connection with specific apparatus, it is to be clearly understood that this description is made only by way of example and not as a limitation to the scope of the invention, as set forth in objects thereof, and in the accompany claims.

What is claimed is:

1. An arrangement to support a circuit panel board at a desired distance from the base of an enclosure; a circuit panel board; a threaded post extending from the enclosure and along which the panel board is translatably adjustable, the panel board having a section provided with a free passage for the post, and a retainer carried by said section for movement transversely of the post from retracted to engaged relation, the retainer having a slot open toward the post when the retainer is retracted, the slot being sized and shaped for reception of the post between threads and for lodgment of the slot furcations between threads upon the actuation of the retainer to engaged relation with the post, so as to retain the panel board at a desired position along the post.

2. The combination for retaining a structure such as a circuit panel board or the like at a desired position; comprising a structure to be retained; a mounting bolt passing freely through a section of the structure; a retainer adapted to be carried by said section for movement transversely of the bolt from retracted to engaged relation to the bolt, the retainer being made of resilient flat plate material, the retainer being formed with a slot open at one end, the open end confronting the bolt when the retainer is retracted, the slot being sized and shaped for reception of the bolt at its minor diameter and the plate material being thinner than the thread pitch of the bolt so that the slot furcations will enter between threads of the bolt when the retainer is moved transversely toward the bolt and will be bent and distorted by the camming pressure of the threads as the retainer is forced to its engaged relation with the bolt, whereby the retainer will be effectively locked against separation from the bolt.

3. The arrangement claimed in claim 2, the retainer being U-shaped and having a pair of initially parallel and flat arms each of which is formed with a said slot and the slots in the two arms being in alignment, the spacing between the arms exceeding the thread pitch of the bolt so that the furcations of the respective slot will be locked between spaced apart threads.

4. The arrangement claimed in claim 3 for a structure of which said section has a free edge and has a thickness commensurate with the spacing between arms of the retainer, so that the retainer may be slipped over the free edge of the section to straddle the thickness of the section.

5. The arrangement claimed in claim 4, said section and an arm of the retainer being provided with co-operable locating hole and stud elements of which the stud is positioned in the hole by flexing of the retainer arms during insertion of the retainer onto said section, whereby the retainer is held to the section in position for transverse movement to its engaged relation with the bolt.

6. Retaining means as in claim 5, the locating hole being substantially larger than said stud to enable the retainer to be shifted translatably relative to said section so as to seek entry between bolt threads for the slot furcations and so as to bring the closed ends of the slots against the bolt regardless of play between the bolt and its passage through said section of the structure.

7. An arrangement for supporting a circuit panel bridge at a chosen position; comprising a circuit panel bridge; a pair of similar mounting bolts extending from the base of an enclosure for the bridge; a pair of similar bars rigidly extending from opposite ends of the panel bridge and having holes affording free passage for the bolts to enable adjustment of the panel bridge along the bolts, the bars having a thickness exceeding the thread pitch of the bolts, and a pair of similar U-shaped retainers, each formed of plate material thinner than the thread pitch of the bolts and having substantially flat and parallel arms spaced just far enough to enable the retainer to be slipped over an edge of either bar and to straddle the bar in the thickness, the pair of retainers being mounted in this manner on the pair of bars for movement transversely of the adjacent bolts, each retainer and bar being provided with co-operable locating elements to locate the retainer in relation to the adjacent bolt, the arms of each retainer having open-ended aligned slots which, with the retainer mounted to said bar, have their open ends facing the adjacent bolt, the slots of each retainer being shaped and sized for reception of said bolt at its minor diameter, so that the slot furcations will enter between threads of the bolt upon the retainer being moved transversely toward the bolt, the furcations upon being forced between threads being deformed thereby so as to lock the retainer effectively to the bolt, the pair of retainers thereby being effective when mounted on said bars and forced against their adjacent bolts, to support and retain the panel bridge at the chosen position along the bolts.

References Cited

UNITED STATES PATENTS

| | | | |
|---|---|---|---|
| 1,001,042 | 8/1911 | Kadel | 85—33 |
| 2,313,131 | 3/1943 | Elias | 240—78 |
| 2,574,107 | 11/1951 | Joy | 85—36 |
| 2,923,385 | 2/1960 | Tinnerman | 287—189.35 |
| 3,005,049 | 10/1961 | Voder | 178—7.9 |
| 3,231,903 | 2/1966 | Cope | 248—27 X |

OTHER REFERENCES

Tinnerman: British printed application No. 578,717, published July 9, 1946.

ROY D. FRAZIER, *Primary Examiner.*

CLAUDE A. LE ROY, *Examiner.*

R. P. SEITTER, *Assistant Examiner.*